May 16, 1933.  H. L. JOYCE  1,909,409

PRESSURE GAUGE UNIT

Filed April 7, 1930

Witness:
William P. Kilroy

Inventor:
Harold L. Joyce
Hill & Hill Attys

Patented May 16, 1933

1,909,409

UNITED STATES PATENT OFFICE

HAROLD L. JOYCE, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

PRESSURE GAUGE UNIT

Application filed April 7, 1930. Serial No. 442,194.

The invention relates to gauges and primarily to that type of these devices which includes a mechanism having associated therewith a pressure responsive means for actuating the mechanism, an indicator and a dial with which the indicator cooperates to indicate pressures.

The invention has as its prime object simplification of manufacture of devices of this character, and the association of certain of the several elements employed in the structure with each other by one operation resulting in the provision of a unitary structure comprised of the several elements.

Specifically, it is an object to associate and secure the dial and a bracket or support for the pressure operable mechanism in unitary relation with a tubular post which forms a communication between the pressure operable mechanism and the system with which the gauge is associated.

It is a further object to secure these elements with each other through the agency of a holding means which is driven through apertures provided in the dial and bracket and into holding relation with the tubular post.

It is another object of the invention to provide for support of a housing or casing by means of the above mentioned tubular post through the agency of a screw or pin which is passed through the casing and driven into the post.

Another object of the invention is to provide the housing with means for engaging the post to assist in holding the casing, post and other elements in proper relation with each other and to further construct the post and casing so that the device may be initially applied for use by rotation of the casing.

The invention has these and other objects, all of which will be explained in detail and more readily understood when read in conjunction with the accompanying drawing which illustrates one embodiment of which the invention is susceptible, it being obvious that changes and modifications may be resorted to without departing from the spirit of the appended claims, forming a part hereof.

In the drawing, Fig. 1 is a front elevation of a gauge embodying the features of the invention;

Figure 1:
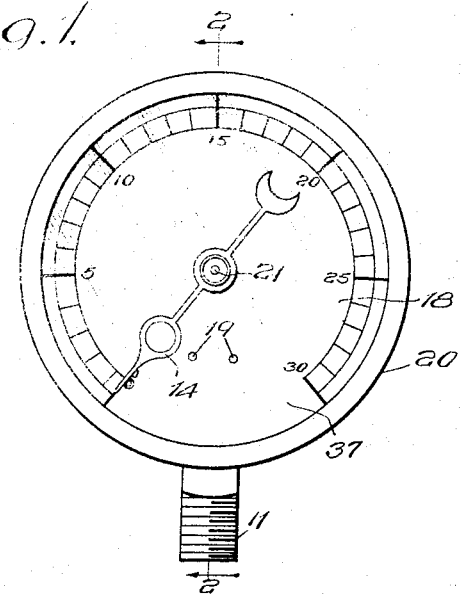
Figure 2:
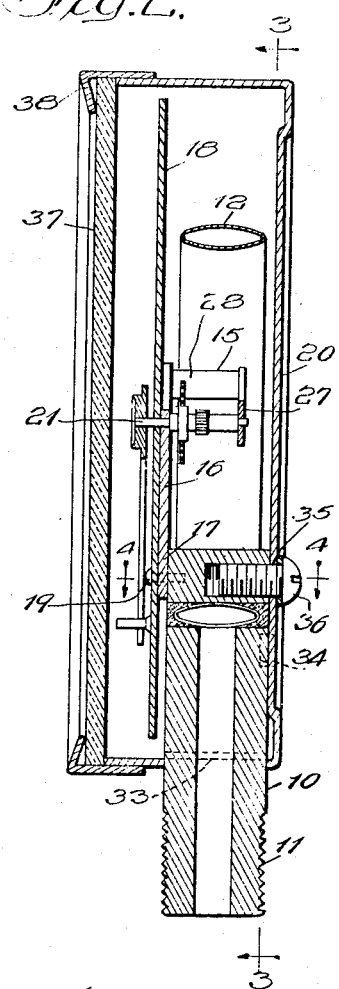
Fig. 2 is a section taken on line 2—2 of Fig. 1.
Figure 3:
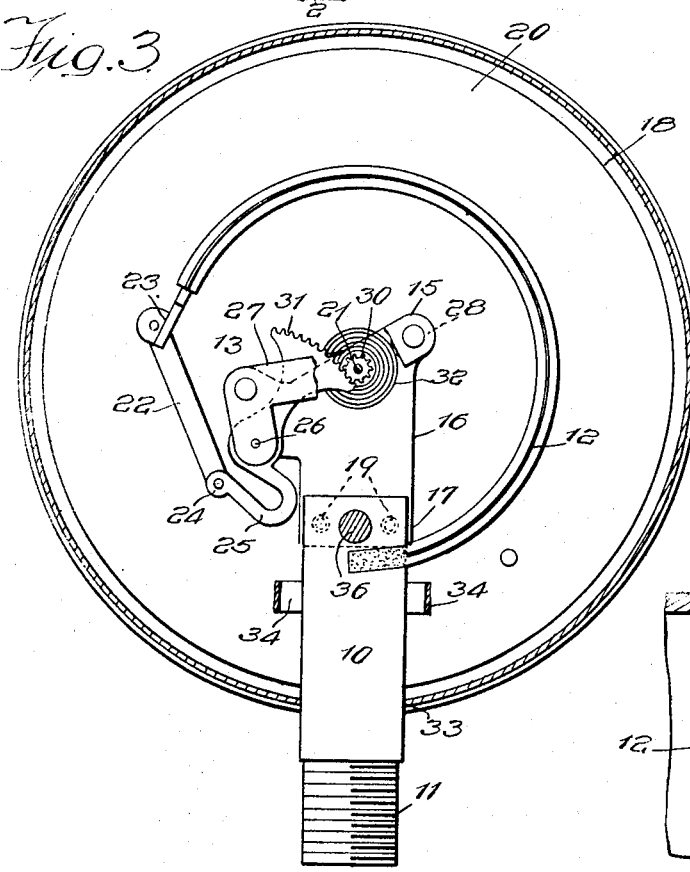
Fig. 3 is a section taken on line 3—3 of Fig. 2.
Figure 4:
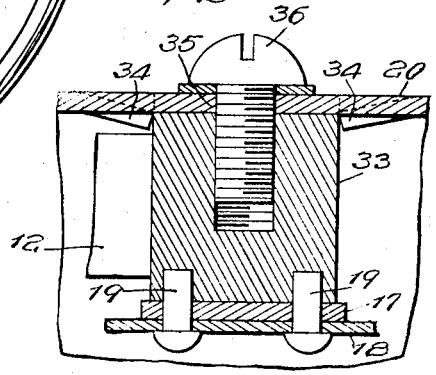
Fig. 4 is a section taken on line 4—4 of Fig. 2.

Gauges of the type above referred to ordinarily embody the use of a tubular post such as 10 which is threaded at 11 to provide means for associating it with an element of the system with which the gauge is designed to be connected for operation. This post is preferably squared and tubular and has a pressure responsive means or Bourdon tube 12 secured thereto for communication with the bore of the tube. One end of said Bourdon tube is secured to a mechanism generally designated 13 for actuating the indicator or pointer 14. The indicator actuating mechanism generally designated 13 is mounted with respect to the tubular post 10 through the agency of a support generally designated 15 which includes a bracket 16 having an extension 17. The gauge includes a dial 18 and the extension 17 of the bracket 16 is interposed between the dial and the post 10. The dial extension 17 of the bracket 16 and the post are each provided with a plurality of apertures through which pins 19 are passed. The pins provide means for holding the dial and the bracket with relation to the post, thus providing a unitary construction composed of these elements which may be arranged within and removed from the housing 20 as a unit.

It is manifest that by arranging the above recited elements in the manner just referred to, particularly the dial and bracket, and thence inserting the pins in said apertures, all that is necessary to unite these elements with the tubular post is to drive the pins into the post which can be accomplished in one operation, which materially reduces the cost of production of a device of this character and consequently the price at which the device may be sold.

In assembling operation, the post, Bourdon tube and pressure operable mechanism 13 are associated with each other and the dial 18 is arranged in position relatively to these elements with the post and other mechanism located in a press, it being understood that the apertures through which the pins 19 are passed are brought into registry with each other so that the pins 19 may be introduced to the apertures, it being also understood that the pins are of a slightly larger diameter than the openings provided in the post, and therefore, as said pins are driven into the post, they frictionally engage the openings in said post and securely hold the dial and bracket 16 with respect to the post, thus producing a unitary structure comprised of the post, dial, pressure operable mechanism 13 including the bracket 16 and the Bourdon tube 12, the indicator 14 being subsequently applied to the shaft 21 of the pressure operable mechanism.

The pressure operable mechanism may be of any suitable character, that herein shown includes a link 22, one end of which is secured to the end 23 of the Bourdon tube 12 and has its opposite end pivotally secured as at 24 to a lever 25 pivoted at 26 and mounted between the bracket 16 of the support and the element 27 of said support.

The bracket 16 and the element 27 are held in spaced relation to each other in the usual manner through the agency of spacers 28. The shaft 21 which carries the indicator 14 is journalled between the bracket 16 and the element 27 and is provided with a pinion 30 which meshes with a toothed segment 31 of the lever 25 and, therefore, when an increased or reduced pressure exists in the Bourdon tube 12, movement will be imparted to this tube which is transmitted to the link 22 and lever 25, segment 31, pinion 30 to the indicator shaft 21, thus causing rotation of the indicator. A coil spring 32 having one end secured to the indicator shaft has its opposite end fastened to some stationary portion of the bracket or support 15 and is provided to maintain the pinion 30 and the teeth 31 of the segment in proper cooperative relation with each other.

The housing 20 is provided with a squared opening 33 through which the tubular element 10 may be passed to introduce the mechanism above described into the casing and to permit its removal therefrom. One wall of the casing has a pair of inwardly projecting spaced lugs 34—34 punched or otherwise formed therein and these lugs are provided to engage the opposite sides of the post 10 and act to assist in holding the casing against movement relatively to said post. This wall of the casing is further provided with an aperture 35 to allow the introduction of a screw or pin 36 through said aperture so that said screw or pin may be introduced into an aperture provided in the post to thereby hold the casing against displacement relatively the post and the elements connected with the latter.

The dial 18 is of a diameter slightly less than the internal diameter of the housing 20 and, therefore, may be arranged within the housing. The usual glass disk 37 is employed to protect the mechanism within the housing against dust, etc., and said disk 37 is held with respect to the housing through the agency of a rim 38 which engages the disk and said housing to hold said disk between the edge of the housing and the rim.

From the foregoing description of the construction, it is manifest that the construction above explained provides means whereby a tubular element such as 10, a dial and a bracket for supporting a pressure operable mechanism may be readily associated with each other to provide a unitary construction comprised of the dial, bracket, post, Bourdon tube and mechanism operable by movement of the tube and that said bracket and dial may be secured to the post merely by driving the pins into the post.

Having thus described the invention, what I claim and desire to cover by Letters Patent is:

1. In a gauge, the combination of a dial, an indicating needle, mechanism for actuating the needle, a bracket for said mechanism, pressure responsive means for actuating said mechanism, a tubular post with which said pressure responsive means communicates, said dial, bracket and post being connected with each other to provide a unit comprised of said dial, bracket and post, securing means, each of said securing means being passed through said dial and bracket and into said post to maintain said dial and mechanism against displacement relatively to said post.

2. In a gauge, the combination of a dial, an indicator needle, mechanism for actuating said needle, pressure responsive means for actuating said mechanism, a tubular post with which said pressure responsive means communicates, a bracket for said mechanism, said bracket having a portion extending between said dial and post and parallel pins extending through the dial and extended portion of the bracket for rigidly pinning said dial and bracket to said post.

3. In a gauge, the combination of a dial, an indicating needle, mechanism for actuating the needle, a frame providing a support for said mechanism, pressure responsive means for actuating said mechanism, a tubular post with which said pressure responsive means communicates, said dial and frame being secured to said post, an element of said frame being located between said dial and post, said element of said frame and post having apertures, the apertures in said dial and element of said frame being correspondingly spaced from the axis of the needle and in register with each other for the reception of holding means, holding means extending through said apertures in said dial and frame and into said post to connect said dial, frame and post in fixed relation with each other.

In witness whereof, I hereunto subscribe my name this 3rd day of April A. D., 1930.

HAROLD L. JOYCE.